United States Patent
Kreisinger et al.

(12) 
(10) Patent No.: US 6,342,774 B1
(45) Date of Patent: Jan. 29, 2002

(54) BATTERY HAVING USER CHARGE CAPACITY CONTROL

(75) Inventors: Robert Daniel Kreisinger; Jason Newton Howard, both of Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/818,014

(22) Filed: Mar. 27, 2001

(51) Int. Cl.[7] ................................................. H02S 7/00
(52) U.S. Cl. ....................................... 320/107; 320/125
(58) Field of Search ................................. 320/107, 125, 320/162; 429/61

(56) References Cited

U.S. PATENT DOCUMENTS

| | | | | |
|---|---|---|---|---|
| 5,254,931 A | * | 10/1993 | Martensson | 320/22 |
| 5,896,024 A | * | 8/1999 | Bradus et al. | 320/125 |
| 6,218,806 B1 | * | 4/2001 | Brotto et al. | 320/106 |

* cited by examiner

Primary Examiner—Gregory Toatley
(74) Attorney, Agent, or Firm—Philip H. Burrus, IV; Bockhop & Reich, LLP

(57) ABSTRACT

A rechargeable battery having a user-selected charge capacity whereby a user of the battery can select the voltage at which the battery is charged, and thus can control the capacity of the battery. The battery has a rigid casing with an exterior surface thereof, and a rechargeable electrochemical cell within the casing. A plurality of charge contacts are accessible at the exterior surface of the casing and are in conductive contact with the electrochemical cell to allow charging of the electrochemical cell when a current is placed across the charge contacts. The battery also has a charge control circuit in conductive contact with at least the charge contacts and the electrochemical cell, and the control circuit includes a voltage regulator that regulates the charge voltage from the charge contacts to the electrochemical cell. A charge selector for the battery is accessible at the exterior surface of the casing and preferably selectively prevents the voltage regulator from regulating the charging of the electrochemical cell.

12 Claims, 1 Drawing Sheet

BATTERY HAVING USER CHARGE CAPACITY CONTROL

BACKGROUND OF THE INVENTION

1. Field of the Invention

The present invention generally relates to portable rechargeable batteries and their construction. More particularly, the present invention relates to a portable rechargeable battery that has a user control for selecting the capacity that the battery can be charged to, and can subsequently discharge.

2. Description of the Related Art

In rechargeable batteries, such as lithium-ion batteries, the charge and discharge cycles have a dramatic impact on the life of the battery. In general, as the voltage charging the batteries increases, the initial capacity of the battery also increases, however the battery cycling life inversely decreases. As an example, if a standard 8 mm Li-ion battery that has a recommended charge voltage of 4.2V is charged to 4.3V, the added termination voltage increases the capacity of the battery between five an fifteen percent. The effect of overcharging the battery to achieve this increased capacity is that the cycle life of the battery is decreased 30–50%. Consequently, manufacturers set the internal charge level of rechargeable batteries to a level that creates a capacity that is effective for the application, but does not significantly adversely impact the battery cycle life.

Due to the manufacturer constraints on the preset charge capacity, the consumer does not have any ability to change the capacity of the battery. The charge level is controlled by the circuitry of the battery so that even a greater voltage applied at the input of the battery will not change the effective charging voltage to the cell. Moreover, batteries do not have an effective indicator to inform the user of the effective charge on the battery. Most batteries only have visual or audible indicators of the battery reaching a preset full-capacity charge. Without an effective indicator of the charge being applied, there is no way for the consumer to safely override the predetermined charge cycle.

Additionally, even if the consumer could increase the charge voltage, the consumer does not have the information regarding the true effective safe level of charging voltage and capacity of the battery in relation to the deleterious effects of the increased charging voltage on the battery life. A manufacturer would therefore be reluctant to allow the consumer to overcharge the battery and greatly shorten the battery life without fully informing the customer that their actions can shorten the battery life, and that any shortened cycle life is not due to a manufactured defect or other fault of the manufacturer.

Accordingly, it would be advantageous to have a rechargeable battery that can have the user set the capacity level that the battery is charged to, even though charging the battery to a high capacity adversely effects the battery's functional life. It is thus to the provision of such an improved battery having a user control that allows the user to select the charge capacity of the battery that the present invention is primarily directed.

DETAILED DESCRIPTION OF THE INVENTION

Figure 1:
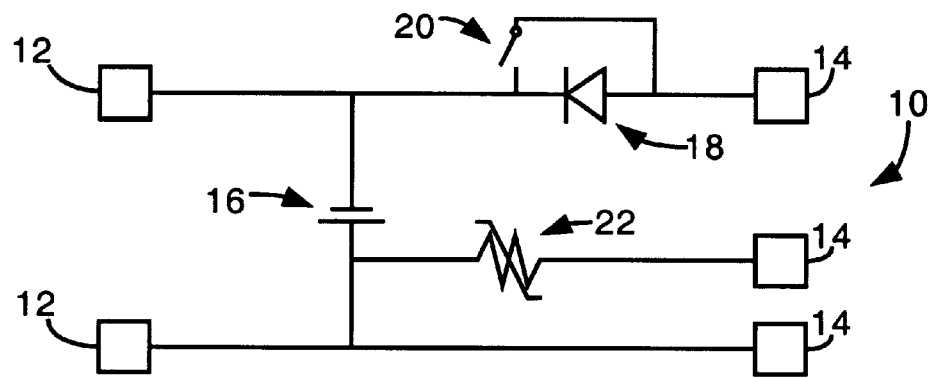
FIG. 1 is a schematic diagram of the charge control circuit of the battery.

With reference to the figures in which like numerals represent like elements throughout, FIG. 1 is a schematic diagram illustrating the charge control circuit 10 of the battery. The control circuit 10 includes a plurality of device contacts 12 and charge contacts 14, which are all in conductive connection to a rechargeable electrochemical cell 16, such as a lithium-ion cell. The control circuit 10 includes a voltage regulator, such as diode 18, that provide a voltage drop to a charge being placed across the charge contact 14 to charge the cell 16 at a specific voltage, and thus, capacity. The one or more device contacts 12 allow the electrochemical cell 16 to selectively provide a current to a device from the electrochemical cell 16, such as a cellular telephone or other electronic equipment.

The control circuit 10 further includes a switch 20 that is accessible by the user of the battery and the actuation of the switch 20 causes the charge path to bypass the diode 20 or other voltage regulator of the control circuit 10 and charges the cell 16 to a desired capacity. A safety component, such as poly-switch 22, is also preferably in the control circuit 10 such that the charging of the electrochemical cell 16 will cease if an unsafe condition is present, such as thermal runaway of the electrochemical cell 16. Consequently, if the user engages the switch 20 to avoid the diode 18, the electrochemical cell 16 will only be charged while the battery is in a safe condition. If the switch 20 remains open, then the diode 18 will cause a voltage drop in the charging cycle of the control circuit 10 and limit the capacity that the electrochemical cell 16 is charged to, which is the common construction of many existing rechargeable batteries.

Figure 2:
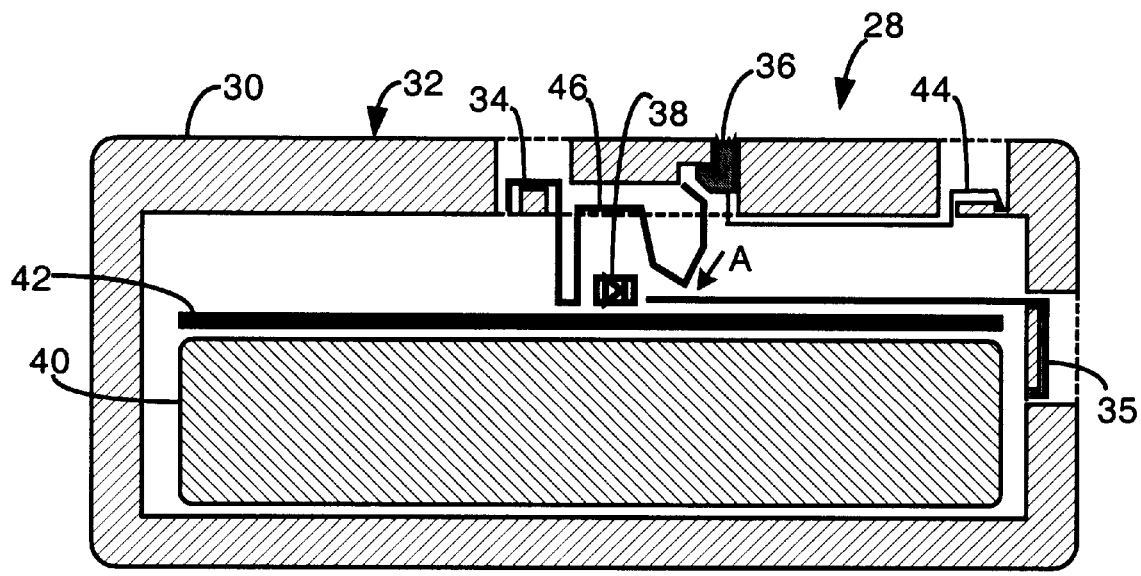
FIG. 2 is a cross-section of the battery illustrating the components that allows the user to selectively control the capacity to which the battery is charged.

FIG. 2 is a cross-section of the rechargeable battery 28 having a user-selected charge capacity. The battery 28 has a rigid casing 30, which is common in the art of battery manufacture and is made of rigid materials such as plastics, metals, or composites. The exterior surface 32 of the casing 32 provides a protective cover and framework to house an electrochemical cell 40, a printed circuit board (PCB 42) or other ASIC logic for the battery, and the components of the control circuit 10, to include the diode 38 or other voltage regulator. Each charge contact 34 is accessible at the exterior surface 32 of the casing 30, and further is in conductive contact with the electrochemical cell 40 through control circuit 10 which allows the charging of the electrochemical cell 40 when a current is placed across the charge contact(s) 34 from an external power source such as a charger as known in the art, or an electrical outlet or other direct electricity source. The battery 28 also includes one or more device contacts 34 that selectively provide a current from the charged electrochemical cell 40 to another electronic device.

The battery 28 has a charge selector 36 accessible at the exterior surface 32 of the casing 30, which is shown here as an actuated button resiliently held by a plastic indicator spring 44. The charge selector 36 is placed above a conductive bridge 46 that, when the charge selector 36 is pushed into the casing 30 and the conductive bridge 46 (as shown in the direction of Arrow A), bridges a charge pathway from the charge contact(s) 34 to the PCB 42 and electrochemical cell 40, thus bypassing the diode 38 and its limiting voltage drop on the charge cycle. In this embodiment of the battery 28, the conductive bridge 34 also bridges a conductive pathway from the PCB 42 and electrochemical cell 40 to the device contact(s) 35 that avoids diode 38 or other voltage regulator. It should be apparent that other components and arrangements can be alternately used to create a charge selector that selectively prevents the voltage regulator (such as diode 38) from regulating the charging of the electrochemical cell 40.

The battery 28 therefore allows a user to select the voltage that the electrochemical cell 40 will be charged to, even though the increased charged capacity of the cell 40 will lessen the life of the battery. The user should thus be informed of the effects of increasing the charge voltage to the battery 28 by engaging switch 44, with such information in the product literature and perhaps on the exterior surface 32 of the casing 30. Furthermore, as embodied in battery 28, when the charge selector 36 is pushed into the casing 30, the indicator spring 44 can become altered or completely pull into the casing 30 such that the user can visually see the altered indicator spring 44 and will know that the charge selector 36 has been engaged and that the electrochemical cell 40 of the battery 28 will consequently have a diminished charge-life expectancy. Even if the charge selector 36 returns to the exterior surface 32 of the battery 28, the indicator spring 44 should remain altered so that the user is aware of the enhanced capacity usage of the battery 28.

While the discussion thus far has been directed towards increasing battery capacity for "heavy duty" users, other users may use their batteries in a very limited fashion. For example, people often carry cellular phones only for safety and emergencies. This type of user may make only one to two five-minute calls per day. This "limited duty" user may actually want to decrease the charge voltage on the cell to increase the cycle life of the battery.

Thus, in another embodiment, the invention could be applied as an "economy mode" switch that reduces, as opposed to increases the voltage. Alternatively, multiple state switches could be included with the battery to continually allow the user to switch between normal, heavy duty and limited duty modes.

Additionally, the invention need not be implemented with a mechanical switch. The switching could be enabled via an embedded firmware algorithm running on a microprocessor in either the phone or the battery. The user may program the algorithm by inputting information through the phone keypad.

In another embodiment of the invention, the firmware algorithm may selectively track the usage of the battery. Tracking usage is known in the art. One enabling example of such tracking may be found in U.S. Pat. No. 5,942,878, issued to Ito on Aug. 24, 1999, and is incorporated herein it its entirety by reference. A primary means of determining discharge in these applications is by using a "Coulomb Counter", which counts milliamp-hours into and out of the battery.

By tracking the usage, the firmware algorithm would make the selection between normal, heavy and limited duty modes automatically. Where it detected only a 10% discharge of the battery when placed in a charger, it would select limited duty mode. When the firmware detected a 70% discharge it would select normal mode, and a completely discharged battery would cause the algorithm to select heavy duty mode.

While there has been shown a preferred embodiment of the present invention, it is to be understood that certain changes may be made in the forms and arrangement of the components without departing from the underlying spirit and scope of the invention as is set forth in the claims. For example, while a preferred embodiment recites firmware as embedded code, the invention could be extended to include computer systems wherein the code runs on a desktop system and the battery is coupled to the computer system via a communications cable.

What is claimed is:

1. A rechargeable battery having a user-selected charge capacity, comprising:
   a. a rigid casing, the casing having an exterior surface;
   b. an electrochemical cell within the casing;
   c. a plurality of charge contacts accessible at the exterior surface of the casing, the charge contacts further in conductive contact with the electrochemical cell to allow charging of the electrochemical cell when a voltage is placed across the charge contacts;
   d. a charge control circuit within the casing, the control circuit in conductive contact with at least the charge contacts and the electrochemical cell, the control circuit including a voltage regulator that regulates the charge voltage from the charge contacts to the electrochemical cell; and
   e. a charge selector accessible at the exterior surface of the casing, the charge selector selectively alters the charging of the electrochemical cell.

2. The rechargeable battery of claim 1, wherein the voltage regulator is a diode.

3. The rechargeable battery of claim 2, wherein the charge selector is an actuated switch on the exterior of the casing.

4. The rechargeable battery of claim 3, wherein the actuating of the switch causes the diode of the control circuit to be bypassed.

5. The rechargeable battery of claim 1, wherein the control circuit further includes one or more device contacts for selectively providing a current to a device from the electrochemical cell.

6. A rechargeable battery having a selective charge capacity, comprising:
   a. at least one rechargeable cell;
   b. a control circuit coupled to the at least one rechargeable battery cell having a multiplicity of charging modes, each charging mode having a unique charging termination corresponding thereto; and
   c. a means of selecting between charging modes.

7. The battery of claim 6, wherein a user actuates the means of selecting between charging modes.

8. The battery of claim 6, wherein the rechargeable battery further comprises a microprocessor having a memory and an embedded firmware algorithm embedded within.

9. The battery of claim 8, wherein the embedded firmware algorithm detects and records data corresponding to the amount of energy discharged from the at least one rechargeable battery cell.

10. The battery of claim 9, wherein the firmware algorithm actuates the means of selecting between charging modes based upon the data corresponding to the amount of energy discharged from the at least one rechargeable battery cell.

11. The battery of claim 7 or 10, wherein the charging mode is selected from the group consisting of limited duty, heavy duty and normal.

12. A rechargeable battery having a selective charge capacity, comprising:
   a. at least one rechargeable cell;
   b. a plurality of charge contacts accessible at the exterior of the at least one rechargeable cell to allow charging of the at least one rechargeable cell when a voltage is placed across the charge contacts;
   c. a charge control circuit, the control circuit in conductive contact with at least the charge contacts, the control circuit including means for regulating the charging of the at least one rechargeable cell; and
   d. a charge selector, the charge selector selectively changing the termination voltage of the at least one rechargeable battery cell.

* * * * *